(No Model.)
W. N. SMITH.
TRICYCLE.
No. 351,942. Patented Nov. 2, 1886.
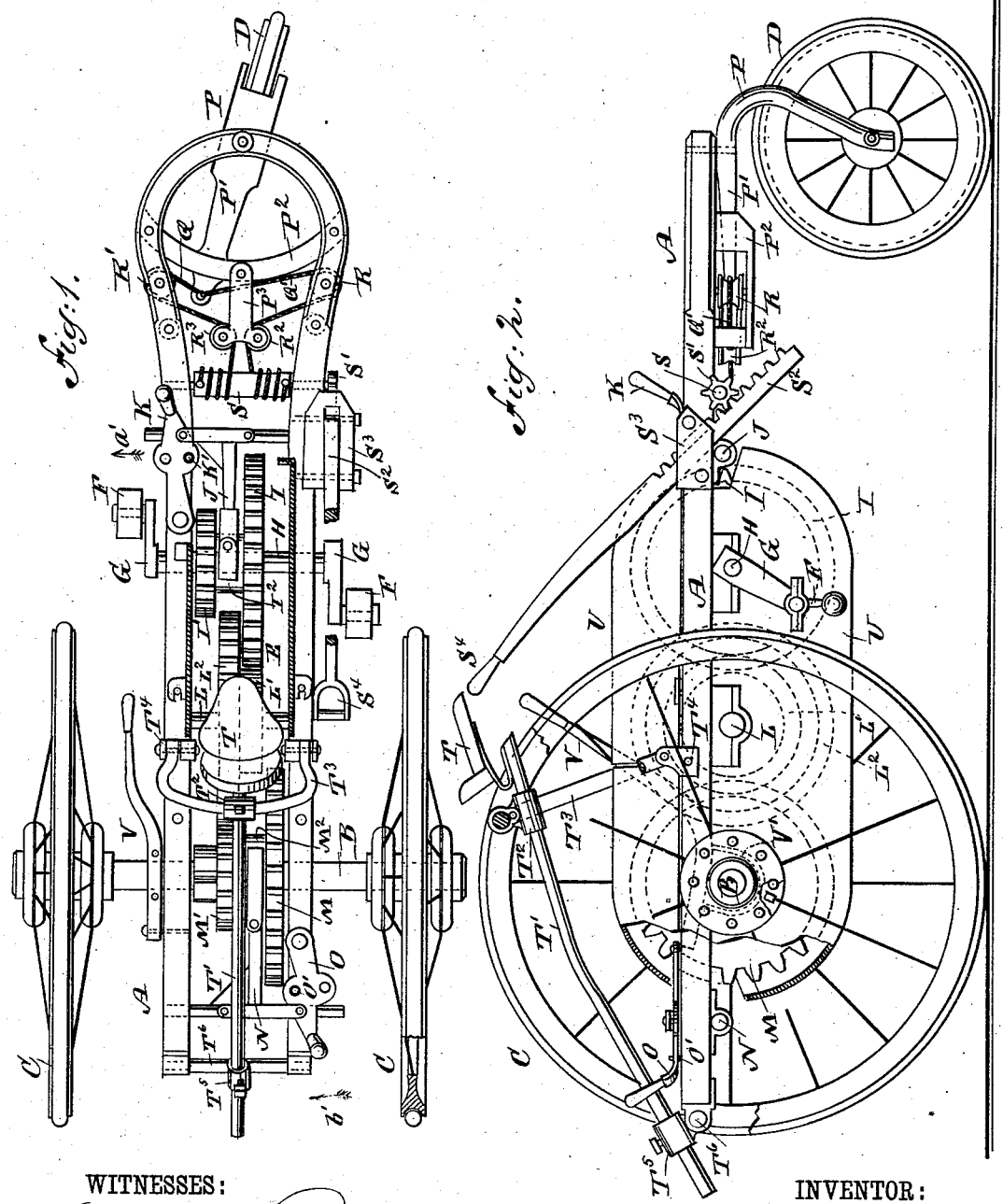
WITNESSES:
INVENTOR:
W. N. Smith
BY Munn & Co.
ATTORNEYS.

UNITED STATES PATENT OFFICE.

WILLIAM N. SMITH, OF BAD AXE, MICHIGAN.

TRICYCLE.

SPECIFICATION forming part of Letters Patent No. 351,942, dated November 2, 1886.

Application filed February 25, 1886. Serial No. 193,235. (No model.)

*To all whom it may concern:*

Be it known that I, WILLIAM N. SMITH, of Bad Axe, in the county of Huron and State of Michigan, have invented a new and Improved Tricycle, of which the following is a full, clear, and exact description.

The object of my invention is to provide a new and improved tricycle in which the speed can be regulated according as the machine is required either for general use, for racing, or for traveling on rough roads or in hilly country.

The invention consists of an interchangeable train of gear-wheels rotating the driving-wheels and operated by treadles, of a steering device, and of an adjustable seat.

The invention also consists of various parts and details and combinations of the same, as will be fully described hereinafter, and then pointed out in the claims.

Reference is to be had to the accompanying drawings, forming a part of this specification, in which similar letters of reference indicate corresponding parts in both the figures.

Figure 1 is a plan view of my improved tricycle, the casing over the gearing being removed. Fig. 2 is a side elevation of the same with parts broken out.

The main frame is mounted on a shaft, B, carrying the driving-wheels C C, and on the steering-wheel D. On the frame A and the shaft B is mounted a train of interchangeable gear-wheels, E, which is set in motion by revolving the balanced treadles F, attached to the crank-arms G, which are secured on each end of a shaft, H, mounted in suitable bearings of the frame A. With the shaft H revolve and are fitted to slide on the same the gear-wheels I and I', of different diameters, and connected with each other by a hub, $I^2$, which is encircled by the shifting frame J, sliding crosswise on the main frame A, and operated by a pivoted lever, K, having two apertures, of which one at a time is fitted over a pin, K', secured to the side arm of the frame A.

Between the shaft B and the shaft H is mounted in suitable bearings on the frame A a shaft, L, to which are secured the gear-wheels L' and $L^2$, of different diameters. With the shaft B revolve and are fitted to slide on the same the gear-wheels M and M', of different diameters, which wheels are connected with each other by a hub, $M^2$, which is encircled by the shifting frame N, sliding crosswise in bearings on the rear end of the main frame A and operated by a pivoted lever, O, similar to the lever K, and having two apertures, of which one at a time fits over the pin O', secured to a side arm of the frame A.

The steering-wheel D is mounted on the upright P, pivotally attached to the front end of the frame A, and provided with a horizontal arm, P', the inner end of which slides in a guide, $P^2$. To the inner end of the arm P' are secured the ends of ropes Q Q', which are passed in opposite directions from each other over grooved pulleys R R', mounted in the sides of the frame A, and over two grooved pulleys, $R^2 R^3$, mounted in a frame, $P^3$, attached to the guide $P^2$, and from there are wound around a drum, S, turning in bearings on the frame A, and provided on one outer end with the pinion S', which meshes into the inclined rack $S^2$, sliding in a dovetailed groove in the bearing $S^3$ and having a handle, $S^4$.

The operator's seat T is attached to a spring fastened to one end of a bent arm, T', having one end held adjustably in a bearing, $T^2$, pivotally attached to the swinging arm $T^3$, pivoted in suitable keepers, $T^4$, on the sides of the main frame A. The other end of the arm T' is adjustable in a bearing, $T^5$, attached to the cross-arm $T^6$, pivoted to the rear ends of the sides of the frame A.

The train of gear-wheels E is inclosed on the top and bottom by a suitable cover, U.

A brake-lever, V, is pivoted to one side of the frame A, and is provided with a band, V', which passes around the shaft B, so that when the lever V is raised the band V' acts as a brake on the shaft B. When the lever V is down, it is used as a hand-rest for the operator.

The tires of the driving-wheels C and the steering-wheel D are each covered with an endless rope, made of hemp, cotton, or other suitable material, twisted or woven.

The operation is as follows: For general use, the gearing will be so arranged that one revolution of the treadles F will cause the driving-wheels C to rotate once, which is accomplished by placing the gear-wheel I in gear with the gear-wheel L' on the shaft L, which in turn must be placed in gear with the gear-wheel M on the shaft B. The gear-wheel I is placed in gear with the gear-wheel L' by moving the lever K outward in the direction of the arrow $a'$ until the inner aperture in the lever K fits over the pin K'. The gear-wheel M, sliding on the shaft B, is placed in gear with the gear-wheel L' on the shaft L, by swinging the lever O inward in the direction of the arrow $b$ until its outer aperture is fitted over the pin O', whereby the gear-wheel M is placed in gear with the gear-wheel L', and at the same time the shifting frame N and the lever O are locked in position. The shifting-frame J and the lever K are locked in a similar position when moved, as before described. The treadles F being set in motion rotate the shaft H and the gear-wheel I, which wheel in turn imparts a rotary motion to the gear-wheel L', which rotates the gear-wheel M, and consequently the shaft B, whereby one rotation is given to the driving-wheels C by one revolution of the treadles F, the gear-wheels I, L', and M being of suitable proportions. For very high speed the train of gear-wheels is connected in the manner shown in Fig. 1, in which the gear-wheel I is in gear with the gear-wheel L' on the shaft L, and the gear-wheel $L^2$ on the same shaft meshes into the smaller gear-wheel M' on the axle or shaft B, one rotation of the treadles F giving four rotations to the shaft B, and consequently to the driving-wheels C. On rough roads or in hilly country, when low speed and great power are required, I place the gear-wheels of the train in such a relative position that the treadle F has to make four revolutions to rotate the driving-wheels C once, which is done by moving the gear-wheel I' on the treadle-shaft H in gear with the gear-wheel $L^2$ on the shaft L, and the gear-wheel M on the shaft B into gear with the small gear-wheel L' on the shaft L. This movement of the gear-wheel I' is accomplished by throwing the lever K in the inverse direction of the arrow $a'$, so that the outer aperture of the lever K is fitted over the pin K' and the gear-wheel M is thrown in gear with the gear-wheel L, as before described. The apparatus is steered by sliding the rack $S^2$ up or down in its bearing $S^3$, by means of the handle $S^4$, which the operator takes hold of when seated on the seat T. The up-and-down movement of the rack $S^2$ rotates the pinion S', and consequently the drum S, whereby one of the ropes, Q or Q', is unwound from the drum S while the other one is wound on the drum so as to move the arm P' to the right or left, the said arm swinging on its pivot on the frame A. The swinging of the arm P' throws the steering-wheel D in a position at angles to the driving-wheels C, whereby the apparatus turns either to the right or to the left.

Having thus fully described my invention, I claim as new and desire to secure by Letters Patent—

1. In a tricycle, the treadles F, attached to the crank-arms G, fastened to the shaft H, the gear-wheels I and I', connected with each other by a hub, $I^2$, the sliding frame J, and the lever K, in combination with the gear-wheels L' and $L^2$, mounted on the shaft L, the gear-wheels M and M', connected by the hub $M^2$, the sliding frame N, the locking-lever O, and the shaft B, carrying the driving-wheels C, substantially as herein shown and described.

2. In a tricycle, the frame A, provided with a train of gear-wheels, E, which are operated by the balanced treadles F, and which set in motion the main driving-wheels C, mounted on the shaft B, in combination with the steering-wheel D, operated by the rack $S^2$, meshing into the pinion S', mounted on the drum S, which winds or unwinds alternately the ropes Q and Q', attached to the arm P', on the vertical part of which is mounted the steering-wheel D, substantially as herein shown and described.

3. In a tricycle, the steering-wheel D, mounted on an arm, P, having an extension, P', the ropes Q and Q', pulleys R, R', $R^2$, and $R^3$, and the drum S, in combination with the rack $S^2$, sliding in a bearing, $S^3$, and having a handle, $S^4$, substantially as herein shown and described.

4. In a tricycle, the combination, with the main frame A, of the seat T, mounted on a bent arm, T', adjustable in the bearings $T^2$ and $T^5$, the bearing $T^2$ being pivotally attached to the swinging arm $T^3$ and the bearing $T^5$ being pivotally attached to the rear end of the frame A, substantially as herein shown and described.

5. In a tricycle, the combination of a train of gear-wheels with two gear-wheels, I and I', connected to each other by a hub, $I^2$, and sliding on and rotating with a shaft, H, having the crank-arms G, on which are mounted the treadles F, with a sliding frame, J, and with the lever K, which can be locked on the main frame A, substantially as herein shown and described.

6. The gear-wheels M and M', connected with each other by a hub, $M^2$, and sliding on and rotating with the shaft B, carrying the main driving-wheels, in combination with a shifting frame, N, and a lever, O, which can be locked in two positions on the frame A, substantially as herein shown and described.

WILLIAM N. SMITH.

Witnesses:
CHARLES E. THOMPSON,
JOHN RYAN.